US006553892B1

(12) United States Patent
Kaneko
(10) Patent No.: US 6,553,892 B1
(45) Date of Patent: Apr. 29, 2003

(54) MOUNTING STRUCTURE FOR PISTON PACKING

(75) Inventor: Junya Kaneko, Abiko (JP)

(73) Assignee: SMC Kabushiki Kaisha, Tokyo (JP)

(*) Notice: Subject to any disclaimer, the term of this patent is extended or adjusted under 35 U.S.C. 154(b) by 126 days.

(21) Appl. No.: 09/686,985

(22) Filed: Oct. 17, 2000

(30) Foreign Application Priority Data

Oct. 18, 1999 (JP) .......................................... 11-295937

(51) Int. Cl.[7] .............................. F01B 29/00; F16J 9/08
(52) U.S. Cl. ................................ 92/88; 92/247; 92/249
(58) Field of Search ..................................... 92/88, 249

(56) References Cited

U.S. PATENT DOCUMENTS 6,092,456 A 7/2000 Noda et al.

FOREIGN PATENT DOCUMENTS

| | | |
|---|---|---|
| CH | 632 074 | 9/1982 |
| CN | 1203331 A | 12/1998 |
| DE | 29 27 777 | 1/1981 |
| GB | 2 202 587 | 9/1988 |
| JP | 49-045278 | 4/1974 |
| JP | 53-045347 | 4/1978 |
| JP | 53-040634 | 9/1978 |
| JP | 59-212159 | 12/1984 |
| JP | 61-070652 | 5/1986 |
| JP | 63-004470 | 1/1988 |
| JP | 63-180459 | 11/1988 |
| JP | 64-012908 | 1/1989 |
| JP | 1-136058 | 9/1989 |
| JP | 02-108446 | 4/1990 |
| JP | 02-169846 | 6/1990 |
| JP | 04-505797 | 10/1992 |
| TW | 372597 | 10/1999 |
| TW | 384956 | 3/2000 |

OTHER PUBLICATIONS

Abridged translation of Office Action from the Taiwan Patent Office, dated Jun. 27, 2001.

*Primary Examiner*—Edward K. Look
*Assistant Examiner*—Michael Leslie
(74) *Attorney, Agent, or Firm*—Paul A. Guss

(57) ABSTRACT

A piston packing has a mounting surface and a seal surface. The seal surface and the mounting surface are fitted with a head and an annular groove portion, respectively, of a piston.

5 Claims, 6 Drawing Sheets

PRIOR ART

MOUNTING STRUCTURE FOR PISTON PACKING

BACKGROUND OF THE INVENTION

1. Field of the Invention

The present invention relates to a piston packing having a seal function, and more specifically, to a piston reciprocating in a cylinder tube which has the openings at both ends blocked by a pair of end plates, and a structure for mounting a piston packing to such a piston in an improved fitting manner.

2. Description of the Related Art

An actuator such as a rodless cylinder is conventionally employed for example as transfer means for a workpiece.

The rodless cylinder has a pair of end plates coupled to both ends of a cylinder tube in the longitudinal direction and a cylinder chamber is formed in the cylinder tube by blocking the openings at both ends of the cylinder tube therewith. In the cylinder tube, a piston reciprocating along the cylinder chamber is mounted and a slider placed to be movable integrally with the piston is attached on the upper side of the piston.

As shown in FIG. 6, a piston 3 moving along the cylinder chamber 2 of a cylinder tube 1 is fitted with a ring-shaped piston packing 5 along an annular groove 4 cut at the outer circumferential surface. In this case, the bottom surface 6 of the annular groove 4 and the seal surface 7 of the piston packing 5 are brought into close contact so that the entire piston packing 5 is stored in the annular groove 4. Meanwhile, the lip portion 8 of the piston packing 5 slidably comes into contact with the inner surface of the cylinder tube 1.

Note that there is an annular projection 9 serving as a wall to engage the piston packing 5 at one end of the piston 3.

The fitting manner of the piston 3 and the piston packing 5 is not limited to such a rodless cylinder but is universally employed for various actuators or the like reduced to practice which are not shown.

Note however that in the conventional rodless cylinder, the width and depth of the annular groove 4 must be kept at prescribed precision in order to allow the piston packing 5 to smoothly achieve the seal function.

Furthermore, the bottom surface 6 of the annular groove 4 serves as a mounting surface and also seal surface of the piston packing 5, and the wall surface of the annular groove 4 must be smoothed by finishing work in order to maintain the seal function.

In addition, there is a demand for subjecting the piston 3 and the piston packing 5 to mass production, thereby reducing the cost.

SUMMARY OF THE INVENTION

A general object of the present invention is to provide a mounting structure for a piston packing which can be subjected to mass production for reducing the cost while maintaining the seal function.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
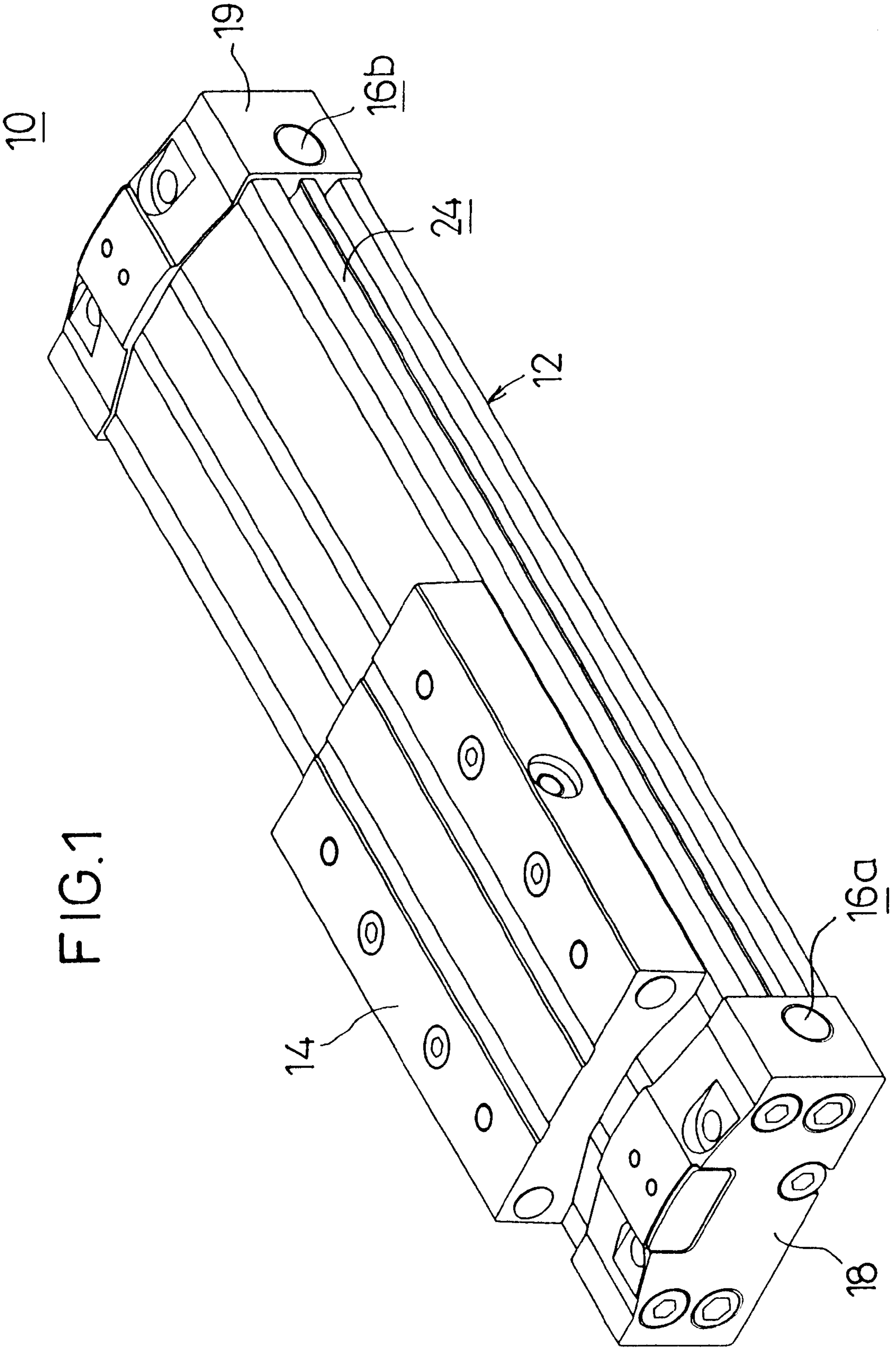
FIG. 1 is a perspective view of a rodless cylinder to which a mounting structure for a piston packing according to an embodiment of the present invention is applied.

A rodless cylinder to which a mounting structure for a piston packing according to an embodiment of the present invention is applied is shown in FIG. 1.

The rodless cylinder 10 includes an elongated cylinder tube 12, a slide table 14 attached to the cylinder tube 12 and capable of reciprocating in the longitudinal direction, and a pair of end plates 18, 19 attached to both ends of the cylinder tube 12 in the longitudinal direction and provided with fluid pressure outlet/inlet ports **16*a*, 16*b***.

Figure 3:
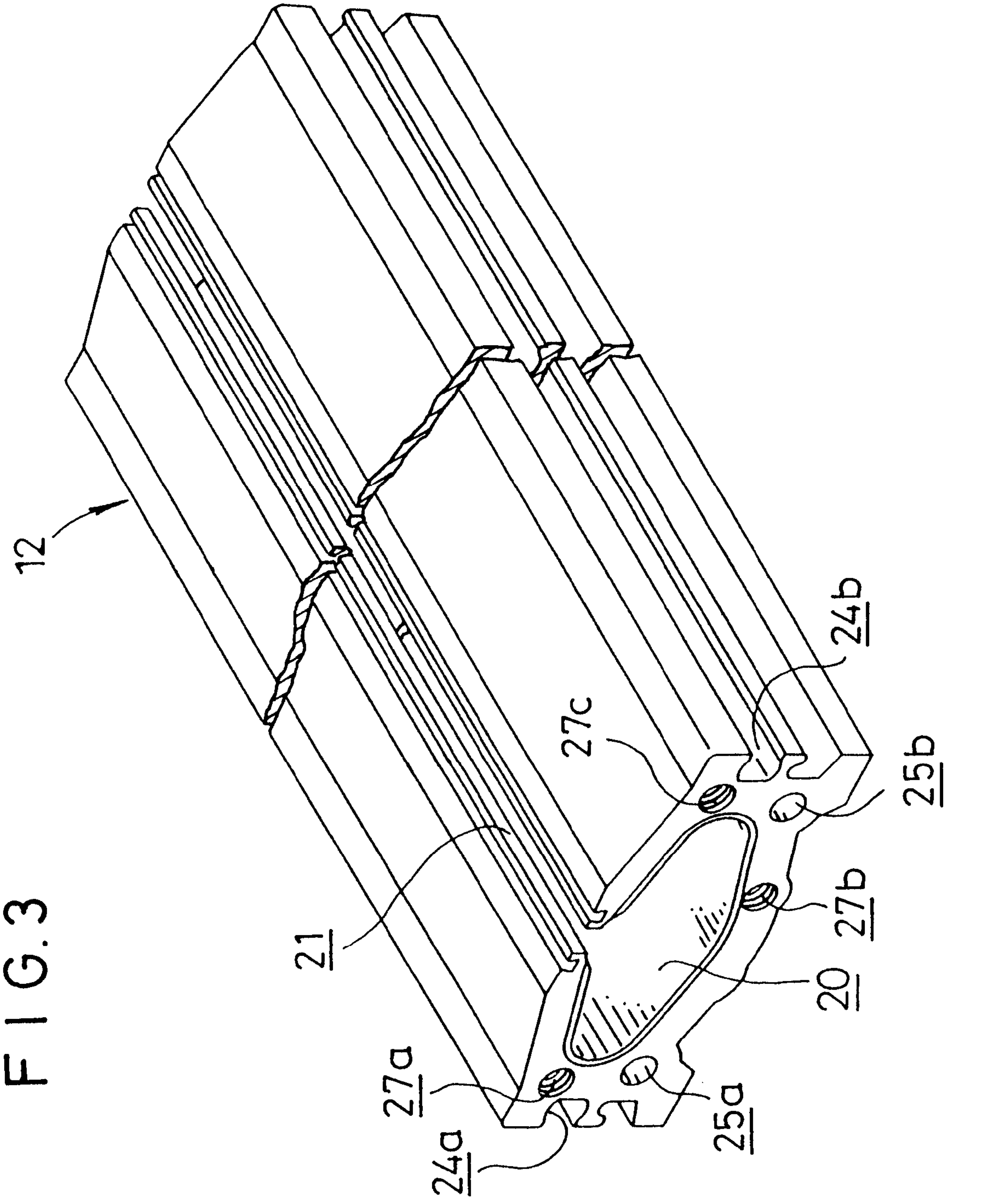
FIG. 3 is a partly omitted, perspective view of a cylinder tube.

In the cylinder tube 12, as shown in FIG. 3, there is formed a bore 20 extending in the longitudinal direction and in communication with the outside through a slit 21 formed at the upper surface of the cylinder tube 12. The slit 21 is sealed in an airtight manner by first and second seal members **22*a*and 22*b* extending in the longitudinal direction of the cylinder tube 12 and engaged by the pair of end plates 18, 19**.

In this case, as shown in FIG. 3, the bore 20 is formed to have an approximately rhombic cross section.

At both side surfaces of the cylinder tube 12, as shown in FIG. 3, elongate grooves **24*a*, 24*b* for attaching a sensor are formed in the longitudinal direction. The elongate grooves 24*a*, 24*b* for attaching a sensor are provided with a sensor (not shown) for detecting the position of a piston 50 which will be described. The elongate grooves 24*a*, 24*b*** for attaching a sensor may also be used as grooves for securing a stopper member which is not shown.

Furthermore, at the end surface of the cylinder tube 12, as shown in FIG. 3, fluid bypass passages **25*a*, 25*b* for centralized piping are formed in the longitudinal direction of the cylinder tube 12. There are also a plurality of screw holes 27*a* to 27*c* for attaching the end plates 18, 19**.

Figure 2:
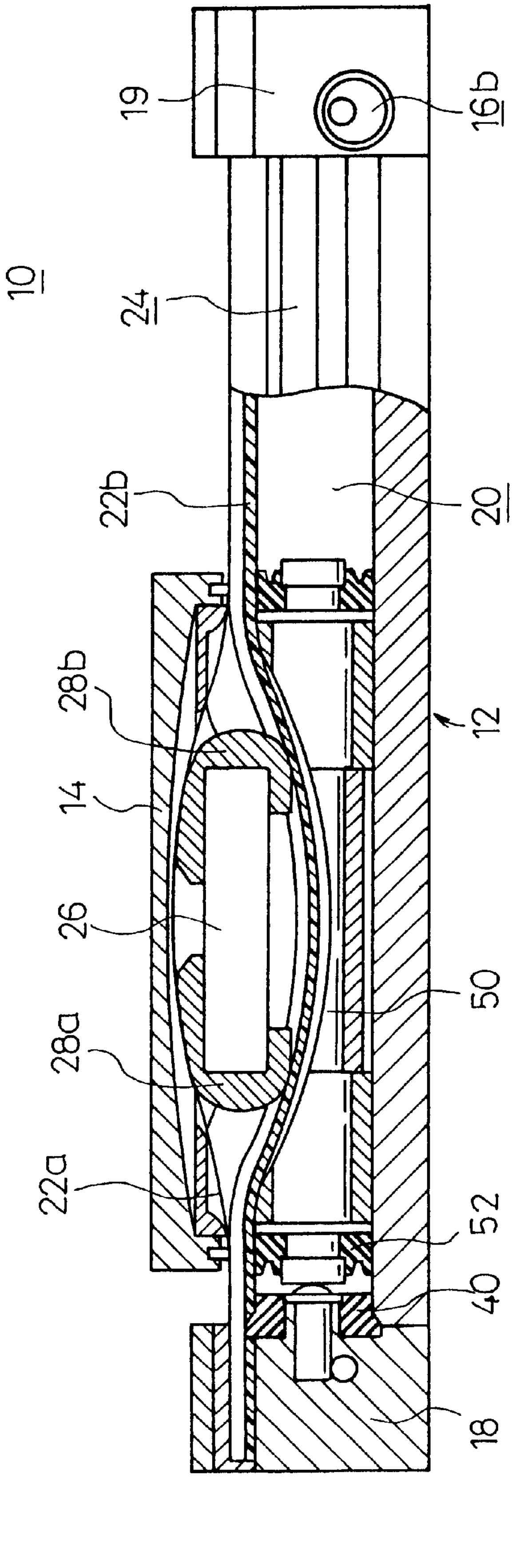
FIG. 2 is a partly sectional, vertical side view of the rodless cylinder in the longitudinal direction.

As shown in FIG. 2, the piston 50 is provided with a piston yoke 26 which projects toward the upper side. At both ends of the upper side of the piston yoke 26, a pair of belt separators **28*a*, 28*b* are formed a prescribed distance apart from one another. The piston 50 is coupled with the slide table 14 so as to cover the piston yoke 26 and the belt separators 28*a*, 28*b*. In this case, the slide table 14 is in contact with the upper surface of the cylinder tube 12** for example through a guide mechanism which is not shown.

Figure 4:
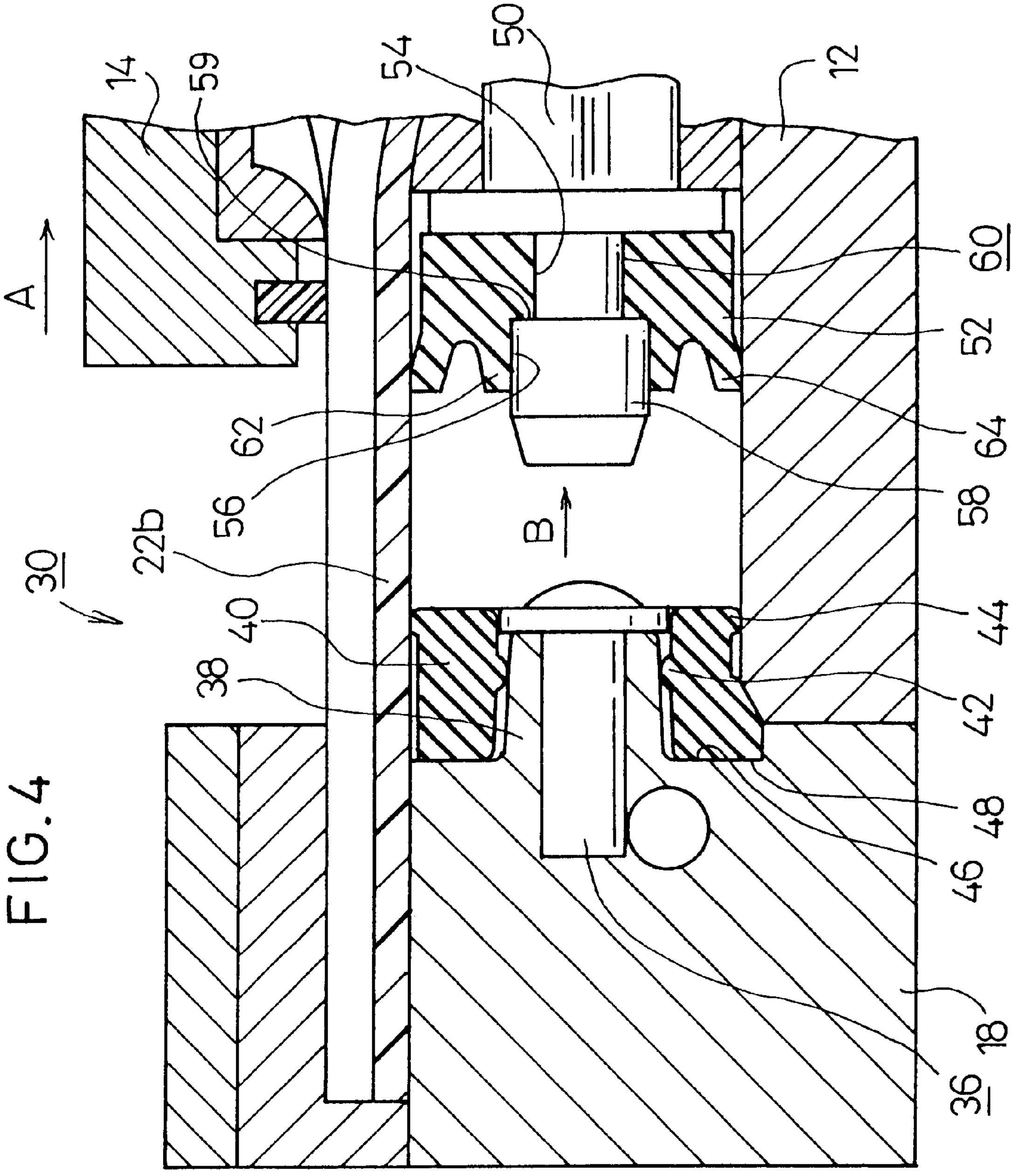
FIG. 4 is a partly enlarged, vertical sectional view of a mounting structure for a piston packing according to the embodiment of the present invention.

As shown in FIG. 4, there is a small projection 38 having a pressurizing fluid inlet/outlet hole 36 about in the center of one end plate 18 joined to the bore 20 in the cylinder tube 12. The cylinder tube 12 has an inner surface shape in cross section similar to a rhombic shape. At the outer circumference of the small projection 38, a seal member 40 having a sectional shape similar to a rhombic shape is fitted.

The seal member 40 has a first seal portion 42 formed by an annular raised portion inscribed in the outer circumferential surface of the small projection 38, a second seal portion 44 formed by an annular raised portion circumscribed around the inner wall surface of the cylinder tube 12, and an attachment surface 48 provided on the opposite side of the second seal portion 44 and joined to a recessed surface 46 of the end plate 18.

Figure 5:
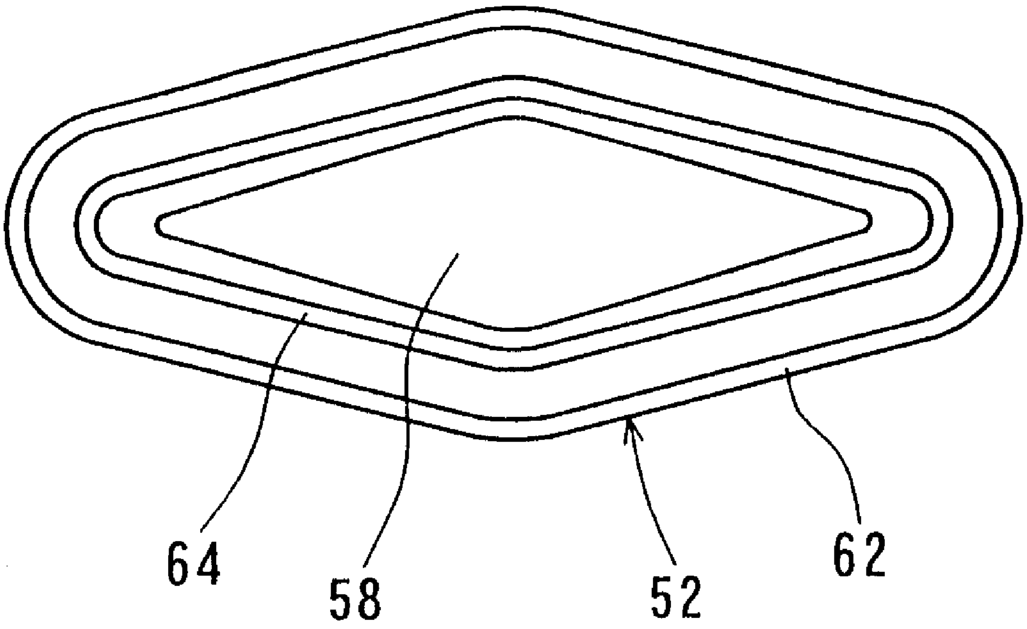
FIG. 5 shows the structure viewed in the direction of the arrow B in FIG. 4.
Figure 6:
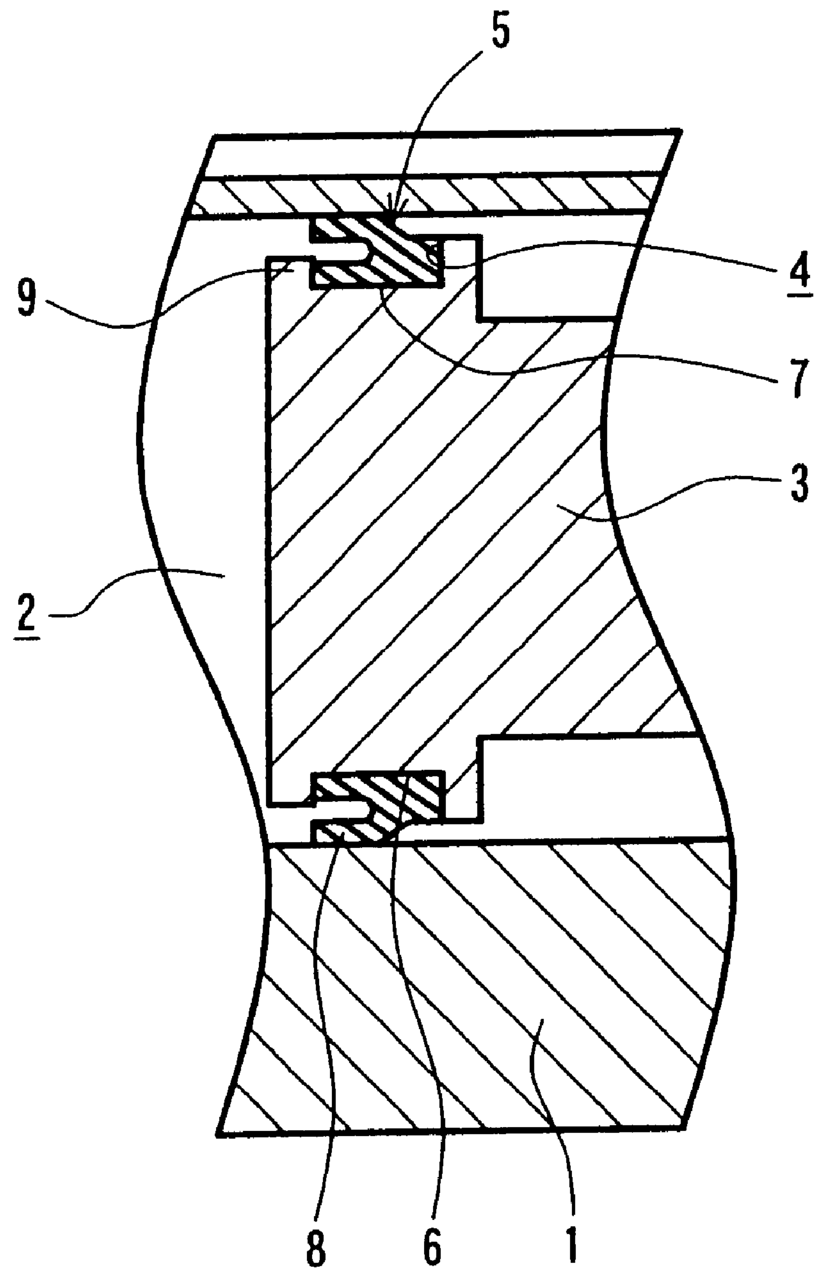
FIG. 6 is a partly sectional, vertical view of a conventional mounting structure for a piston packing.

Note that the piston 50 has a sectional shape similar to the rhombic shape as shown in FIG. 5, and the piston 50 is provided with an annular groove portion 60 at a head 58 to be fitted with the seal surface 56 of a piston packing 52 which will be described. The mounting surface 54 for the piston packing 52 is fitted into the annular groove portion 60.

The mounting surface 54 is provided at the inner circumference of the piston packing 52, and formed by an annular raised portion projecting by a prescribed length inwardly in the radial direction. The shape of the annular groove portion 60 of the piston 50 is formed corresponding to the mounting surface 54 of the piston packing 52.

As shown in FIG. 5, the piston packing 52 has a shape similar to the approximate rhombic cross section of the bore 20. The mounting surface 54 of the piston packing 52 is formed at the inner circumferential surface of the annular raised portion, while the seal surface 56 is formed at the inner circumferential surface of the annular recessed portion. In addition, a stepped surface 59 having a step is formed between the mounting surface 54 and the seal surface 56 (at the boundary of the mounting surface 54 and the seal surface 56), so that the piston packing 52 has the mounting surface 54 and the seal surface 56 formed independently of one another at the inner circumferential surface.

At the side surfaces of the piston packing 52, an inner circumferential lip portion 62 and an outer circumferential lip portion 64 are formed.

When the piston 50 is formed by casting using segment dies which are not shown, the head 58 is provided with portions to which the mounting surface 54 and seal surface 56 of the piston packing 52 are fitted and the stepped surface 59 formed between the mounting surface 54 and seal surface 56 is used as an opening surface for the segment dies. Thus, the opening surface for the segment dies is not formed within the range of the seal surface 56, and therefore a parting line generated at the opening surface for the segment dies does not have to be machined.

Stated otherwise, the opening surface for the segment dies and the stepped surface 59 are matched, so that the parting line generated at the opening surface for the segment dies is formed in a surface other than the seal surface 56, so that post treatment for removal of the parting line is not needed, which simplifies the manufacturing process.

Note that in the present embodiment described above, the piston 50 and the piston packing 52 have an approximate rhombic cross section, but the invention is not limited to the shape and may be applied to those with a circular, rectangular or ellipse cross section.

The rodless cylinder 10 to which the mounting structure 30 for a piston packing according to the present embodiment is applied basically has the structure described above, and the operation, function and effect will be now described.

When a pressurizing fluid such as compressed air is let in from the pressurizing fluid inlet/outlet hole 36, the piston 50 starts to move in the direction indicated by the arrow A in FIG. 4. When the piston 50 thus moves, the piston packing 52 has its mounting surface 54 and seal surface 56 fitted into the annular groove portion 60 and the head 58 of the piston 50, respectively. The inner and outer lip portions 62, 64 are brought into close contact with the inner circumferential surface of the cylinder tube 12 and the outer circumferential surface of the head 58 of the piston 50 under the pressure of the air to prevent the compressed air acting upon the piston 50 from being leaked, so that the seal function can be secured.

According to the present embodiment, the seal function similar to the function in the conventional case is maintained, while the mounting surface 54 holding the piston packing 52 and the seal surface 56 achieving the seal function are independently formed and the parting line is formed at the stepped surface 59 between the mounting surface 54 and seal surface 56, so that the post treatment is not necessary. As a result, the piston 50 can be subjected to mass production using dies or the like, which can reduce the manufacturing cost.

Also according to the present embodiment, the annular projection 9 serving as a wall to engage the piston packing 52 is removed so that the length of the piston 50 in the longitudinal direction can be reduced for the thickness of the annular projection 9.

What is claimed is:

1. A mounting structure for a piston packing for use in an actuator, said actuator comprising:

a cylinder tube;

end plates to seal openings on both ends of said cylinder tube;

a piston to reciprocate along a bore in said cylinder tube, said piston having an annular groove portion, a head portion and a stepped surf ace between said annular groove and said head portion; and said piston packing being fitted into said piston and slidably coming into contact with an inner circumferential surface of said cylinder tube, wherein said piston packing is provided with a seal surface having a seal function to block the communication of one and the other sides of the bore and a mounting surface engageably attached to said piston to hold the piston packing, said seal surface and said mounting surface being separated by said stepped surface and being independent of each other such that said mounting surface is fitted in said annular groove of said piston and the entirety of said seal surface is fitted on and in contact with said head portion.

2. The mounting structure for a piston packing according to claim 1, wherein said mounting surface is formed at the inner wall surface of an annular raised portion provided at the inner circumference of the piston packing and projecting inwardly in the radial direction.

3. The mounting structure for a piston packing according to claim 1, wherein said stepped surface of said piston is formed at an opening surface of segment dies, such that said stepped surface is disposed corresponding to a surface other than said seal surface when said piston packing is fitted on said piston.

4. The mounting structure for a piston packing according to claim 3, wherein said stepped surface is formed at the boundary portion between the mounting surface and the seal surface.

5. The mounting structure for a piston packing according to claim 1, wherein said actuator includes at least a rodless cylinder.

* * * * *